United States Patent Office 2,830,943
Patented Apr. 15, 1958

2,830,943
METHOD FOR CONTROLLING THE IRRADIATION OF POLYETHYLENE

Kenneth J. Mackenzie, Jr., Pittsfield, Mass., assignor to General Electric Company, a corporation of New York No Drawing. Application November 3, 1955
Serial No. 544,837
1 Claim. (Cl. 204—154)

This invention is concerned with a method for visually controlling the level of radiation introduced into polyethylene by means of irradiation of the latter with a source of high energy radiation, such as high energy electrons. More particularly, the invention is concerned with a process for determining the degree of radiation introduced into polyethylene as it passes through a beam of high energy radiation, which process comprises incorporating in the polyethylene prior to irradiation with the high energy radiation, a compatible dye, specifically Sudan III.

In the copending application of Elliott J. Lawton and Arthur M. Bueche, Serial No. 324,552, filed December 6, 1952, there is disclosed and claimed a method for the treatment of polyethylene with high energy radiation, specifically high energy electrons with a high voltage accelerating apparatus such as that using a resonant transformer or Van de Graaf accelerator, for the purpose of rendering the polyethylene insoluble in solvents in which it is ordinarily soluble, and infusible at elevated temperatures. The equipment designed for irradiating the polyethylene, although it is fairly constant in the dose it will deliver, nevertheless, does not permit satisfactory control over the dose level introduced into the polyethylene because of the inability to determine exactly when an adequate dose has been introduced into the polyethylene. This problem is particularly acute in connection with the continuous control of irradiation of polyethylene tapes and films.

Unexpectedly, I have discovered that when a certain dye, specifically Sudan III, which has the formula

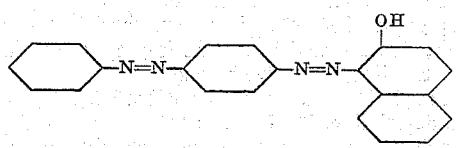

incorporated in small amounts in polyethylene, it imparts color to the system which is sensitive to radiation by the electron beam. Such a combination of dye and polyethylene can be advantageously used for radiation dosimetry so that individual pieces of dyed polyethylene can give quick, visual evidence of the irradiation dose introduced into the polyethylene. In the form of continuous tapes or films, the color change can be used to control the irradiation of the tape or film, either visually or spectrophotometrically. What is particularly significant is the fact that this particular dye, after use as irradiation control, can be bleached to an essentially colorless state by further irradiation with doses which do not adversely affect the properties of the irradiated polyethylene.

It was entirely unexpected and in no way could have been predicted that this particular dye when incorporated in the polyethylene would impart to the polyethylene the ability to be irradiated in such a way that control of the irradiation dose could be maintained within fairly narrow limits, because similar dyes such as aminoazobenzene, benzidine, methylene blue, and benzopurpurin failed to undergo any visual or significant change in shade or color, as a result of variations in the irradiation dose. In some instances, the dyes incorporated did show some change, but could not be rendered colorless by additional irradiation which would not adversely affect the polyethylene. Some dyes changed color so rapidly and at such low dose that they were of no practical use for control irradiation of the polyethylene with high energy electrons.

In addition, unexpectedly it was found that some dyes, such as Indophenol, when incorporated in the polyethylene, were not satisfactory for the purpose because they were not stable. Thus, Sudan III, when incorporated in the polyethylene was quite stable to sunlight and ultraviolet light for long periods of time, and no undue precaution had to be taken when storing samples of polyethylene containing Sudan III incorporated therein, either before or after irradiation with high energy electrons. In contrast to this, Indophenol, although it did show certain changes in color when irradiated with high energy electrons, was relatively unstable in the presence of sunlight and ultraviolet light so that it became bleached by ultraviolet light giving variations in color in the film samples, depending upon the degree of contact with the ultraviolet light. Thus, its value as an irradiation control indicator was materially reduced because of this defect.

The reasons for the change in color of the Sudan III in the presence of the high energy electrons are not clearly understood. However, it is believed that unexpectedly the change in color may be due to a reduction of the dye by hydrogen liberated during the irradiation of the polyethylene.

The manner whereby the present invention may be practiced is relatively simple. It is only necessary to incorporate the dye in the polyethylene employing amounts which maintain the dye in a compatible state and yet are sufficient to show the changes in irradiation dose. In general, it is only necessary to mill the dye into the polyethylene on a roller mill used advantageously at a temperature of about 100 to 125° C. and insuring that complete and homogeneous dispersion of the dye in the polyethylene is attained. Thereafter, if desired, the polyethylene can be sheeted into the form of sheets or tapes and subjected to irradiation with a high energy radiation, e. g., high energy electrons.

The amount of the dye incorporated will vary with such factors as the molecular weight of the polyethylene, the limits of the radiation dose to which the polyethylene may be subjected, etc. In general, I may use from about 0.001 to about 0.5%, by weight, of the dye, based on the weight of the polyethylene. When using the Sudan III in concentrations of 0.1% and higher, the color changes from red to orange to pale orange with a dose in the range of 5 to $15 \times 10^6$ R (roentgens). The color change is proportional to the dose. At a concentration of 0.05% Sudan III, the color changes to orange in the range of between 0.1 to $5 \times 10^6$ R, and then bleaches in the range of from about 5 to $15 \times 10^6$ R. At a concentration of about 0.02%, the color is bleached at a dose of around $5 \times 10^6$ R. As pointed out above, the color changes are proportional to concentration of dye and total dose.

The color changes are very pronounced immediately after exposure to radiation but slowly change on standing and are subsequently stabilized. No reversion of color was noted on heating; instead, bleaching usually occurred. There was no apparent oxidative effect.

Exact dye concentration depends to some extent on the color change desired, that is, whether to obtain a change over a wide spectral range or whether it is desired to bleach the color out completely. Concentrations on the order of 0.05% to 0.1%, by weight, are generally preferred. Higher concentrations would require greater doses to obtain noticeable change and the dye usually bleeds out at concentrations much above 0.1 to 0.2% concentration.

The irradiating apparatus used in irradiating the dye containing polyethylene is more particularly described in the above-mentioned Lawton and Bueche application as well as in Cole application, Serial No. 437,477, filed June 17, 1954, and assigned to the same assignee as the present invention. By reference, these two applications are made part of the disclosures of the present application not only for the irradiation apparatus described therein, but also for their description of the polyethylene which can be employed in the practice of the present invention. As pointed out in the aforesaid Cole application, the polyethylene may range in molecular weight from about 2,000 to about 30,000 or more, for instance, as high as 35 to 40,000, especially when made by new processes requiring low pressures and temperatures such as that used to manufacture Marlex polyethylene made by Philips Petroleum Company, and polyethylene manufactured by the Ziegler process described in U. S. Patent 2,699,457, issued January 11, 1955.

In order that those skilled in the art may better understand how the present invention may be practiced, the following example is given by way of illustration and not by way of limitation. All parts are by weight.

In the following example, the polyethylene used was Bakelite DYNH having a molecular weight of about 23,000. The apparatus used for irradiation purposes was the same as that described in the above-mentioned Bueche and Lawton application and is also described in Westendorp Patent 2,144,518 as well as in the magazine Electronics, volume 17, pages 128–133 (1944).

Each of the dyes mentioned below was incorporated in the polyethylene in stipulated amounts by milling the same. Thereafter, sheeted samples of the dye-containing polyethylene were obtained by molding about 30 to 40 grams of the dyed polyethylene in a 5″ square picture frame mold to give sheets of about 60 to 100 mils thick. Strips of the dyed polyethylene 1″ x 5″ were cut in half. One strip of each dyed sample was irradiated with a $5 \times 10^6$ R and the other strip was irradiated with $10 \times 10^6$ R.

*Example 1*

In this example, samples of polyethylene containing 0.2% by weight thereof of Sudan III, as well as the same weight of aminoazobenzene, were subjected to the two above-mentioned radiation doses. The polyethylene containing the Sudan III prior to radiation was red. As a result of irradiation with $5 \times 10^6$ R and $10 \times 10^6$ R, it was found that the Sudan III at $5 \times 10^6$ R was a light orange brown and at $10 \times 10^6$ R was almost colorless.

When the concentration of Sudan III was decreased to 0.1%, the bright red color in the polyethylene was changed to light orange over the range of 1 to $15 \times 10^6$ R; steps of $1 \times 10^6$ R could be readily distinguished. At a concentration of 0.05% of the Sudan III, the higher doses caused complete bleaching of the color while at a concentration of about 0.02%, bleaching occurred at about $5 \times 10^6$ R.

The sample containing the aminoazobenzene was unsatisfactory for control purposes in determining irradiation doses because the color faded very gradually rather than changed color over a wide irradiation dose range up to as high as $10 \times 10^6$ R.

In general, tests have shown that with Sudan III, concentrations of the dye in the range of 0.005 to 0.1%, by weight, appear to be best. The higher concentrations show residual color upon irradiation within this range. As the concentration is lowered, the color can be bleached at doses within the ranges of about 1 to $15 \times 10^6$ R. It is thus possible to obtain a dye concentration so at a given selected dose will cause bleaching, and this would give a simple minimum dose control.

It will, of course, be apparent to those skilled in the art that other concentrations within the optimum ranges described above of the Sudan III may be employed without departing from the scope of the invention. In addition, the types of polyethylene which may be used with the dye may also be varied within the spirit of the invention. The presence of polyethylene stabilizers and of finely divided fillers, such as, silica fillers, which are inert in the presence of the dye, is not precluded.

The dye-containing polyethylene can thus be controlled as far as irradiation dose is concerned on a continuous basis and if desired any traces of color remaining in the polyethylene can be removed by treatment with a high irradiation dose to cause bleaching of the dye in the polyethylene. However, ordinarily this is not necessary because the slight color usually present in the irradiated polyethylene is often of a pleasing nature and may very well lend itself to various uses in the arts.

The polyethylene-dye system described above in addition to being used for means for controlling the dose of polyethylene may also be used as radiation dosimeters. Included among such are static dosimeters such as the personnel type (badges, etc.), area type (to measure the long term radiation in given points in the area), special types for measuring radiation beam patterns, etc.

Polyethylene containing Sudan III can be used in electrical applications without any apparent diminution in properties in the polyethylene, nor is there any apparent effect on the heat-aging of the polyethylene due to the presence of the dye. It should be kept in mind that the color changes induced by irradiation are proportional to the concentration of the dye and to total radiation dose, and therefore some evaluation of the effect of the dye on the polyethylene will be necessary before one can decide upon any particular dye concentration to be used in connection with any specific radiation dose. Determination of this is a relatively simple matter and once evaluated can be used continuously in the irradiation of polyethylene to control the irradiation dose within fairly narrow limits. Thus, if one employs a concentration of, for instance, Sudan III which gives a certain shade within a certain dose and while the said dose is being applied to the dye-containing polyethylene, if the shade should change, it will be apparent to the operator that a different irradiation dose is being introduced into the polyethylene, and this will require adjustment of the high voltage accelerating apparatus to bring it back into line with the desired dose. The visual color change is quite apparent and rapid so that there is no substantial loss of polyethylene due to the fact that an improper dose has been introduced into the polyethylene.

Although Roentgen units have been employed in the above description, it will be apparent that an alternative terminology can be used and in place of Roentgen units, one can employ the term "Roentgen equivalent physical" or more briefly "REP."

What I claim as new and desire to secure by Letters Patent of the United States is:

The process for continuously controlling and determining the irradiation dose being introduced into polyethylene irradiated with high energy electrons emanating from a high voltage accelerating apparatus, which process comprises incorporating in the polyethylene from 0.001 to 0.5 percent, by weight Sudan III, based on the weight of the polyethylene, and thereafter subjecting the dye-containing polyethylene to irradiation with high energy electrons within a dose range of from about $1 \times 10^6$ REP's to $15 \times 10^6$ REP's thereby causing a chemical reduction of the Sudan III dye in the polyethylene to produce a decreased color intensity proportional to an increase in the irradiation dose.

References Cited in the file of this patent

Day: "Nature," vol. 168, pages 644, 645; Oct. 13, 1951.

Henley et al.: "Nucleonics," vol. 9, No. 6, pages 62–66; December 1951.

Sun: "Modern Plastics," vol. 32, pp. 141–144, 146, 148, 150, 229–233, 236–238; September 1954.